United States Patent
Brand et al.

(10) Patent No.: US 8,470,924 B2
(45) Date of Patent: Jun. 25, 2013

(54) COLOR-PIGMENTED PAINT COMPOSITION HAVING HIGH COVERING POWDER, INCREASED SCRATCH RESISTANCE, AND EASY-TO CLEAN PROPERTIES

(75) Inventors: Stefan Brand, Hirschberg-Leutershausen (DE); Andreas Dierdorf, Hofheim (DE); Hubert Liebe, Wiesbaden (DE); Frank Osterod, Liederbach (DE); Markus Mahn, Frankfurt (DE); Ken Ryan, Hatfield, PA (US)

(73) Assignee: AZ Electronic Materials USA Corp., Somerville, NJ (US)

( * ) Notice: Subject to any disclaimer, the term of this patent is extended or adjusted under 35 U.S.C. 154(b) by 287 days.

(21) Appl. No.: 12/600,050

(22) PCT Filed: May 15, 2008

(86) PCT No.: PCT/EP2008/003887
§ 371 (c)(1),
(2), (4) Date: Dec. 8, 2009

(87) PCT Pub. No.: WO2008/138610
PCT Pub. Date: Nov. 20, 2008

(65) Prior Publication Data
US 2010/0305245 A1 Dec. 2, 2010

(30) Foreign Application Priority Data
May 16, 2007 (DE) .................. 10 2007 023 094

(51) Int. Cl.
*C08L 83/16* (2006.01)
(52) U.S. Cl.
USPC ............................ 524/588; 524/715; 524/869
(58) Field of Classification Search
USPC ......................... 524/588, 715, 869
See application file for complete search history.

(56) References Cited

U.S. PATENT DOCUMENTS

| | | | |
|---|---|---|---|
| 6,652,978 B2 | 11/2003 | Lukacs, III et al. | |
| 2002/0015851 A1* | 2/2002 | Higuchi et al. | 428/447 |
| 2003/0083453 A1 | 5/2003 | Lukacs, III et al. | |
| 2003/0113657 A1* | 6/2003 | Nagahara et al. | 430/270.1 |
| 2005/0279255 A1 | 12/2005 | Suzuki et al. | |
| 2007/0190308 A1 | 8/2007 | Brand et al. | |
| 2007/0254975 A1* | 11/2007 | Arney et al. | 522/99 |
| 2008/0096024 A1* | 4/2008 | Cavallin | 428/426 |
| 2008/0107894 A1 | 5/2008 | Brand et al. | |
| 2008/0178536 A1 | 7/2008 | Johnson | |

FOREIGN PATENT DOCUMENTS

| | | |
|---|---|---|
| JP | 11-269432 A | 10/1999 |
| JP | 2002-80776 A | 3/2002 |
| JP | 2006-273942 A | 10/2006 |
| WO | WO 2004/011212 A1 | 2/2004 |

OTHER PUBLICATIONS

R. Walsh, "Bond Dissociation Energy Values in Silicon-Containing Compounds and Some of Their Implications", Acc. Chem. Res. vol. 14, Issue 8, pp. 246-252 (1981).

* cited by examiner

*Primary Examiner* — Margaret Moore
(74) *Attorney, Agent, or Firm* — Sangya Jain

(57) ABSTRACT

The present invention is directed to a color-pigmented paint composition with high hiding power, comprising a solvent or a solvent mixture and
a.) based on the total formulation, 1% to 80% by weight of a polysilazane of the formula (1)

$$-(SiR'R''-NR''')_n-  \quad (1)$$

and
b.) based on the total formulation 1% to 15% by weight, particularly 2% to 8% by weight, of one or more pigments wherein R', R", and R'" are alike or different and independently of one another are hydrogen or an unsubstituted or substituted alkyl, aryl, vinyl or (trialkoxysilyl)alkyl radical, n being an integer and n having a magnitude such that the polysilazane has a number average molecular weight of 150 to 150 000 g/mol.

18 Claims, No Drawings

COLOR-PIGMENTED PAINT COMPOSITION HAVING HIGH COVERING POWDER, INCREASED SCRATCH RESISTANCE, AND EASY-TO CLEAN PROPERTIES

Color-pigmented paint composition having high covering power, increased scratch resistance and easy-to-clean properties This invention relates to paint compositions which can be used in areas of application requiring high color strength and hiding power, improved scratch proofing, enhanced weathering stability, and enhanced cleaning properties.

Paint systems of this kind are needed more particularly for vehicles such as motor vehicles, buses, construction machinery and rail vehicles, where the need is for a durable coating system with color appeal. Here, particular requirements apply in respect of the durability both of the color and of the long-term scratch resistance.

In many cases, attempts are made to achieve this profile of requirements by means of a multicoat system. For instance, within the automobile segment, a four-coat system is encountered which is composed of primer, surfacer, basecoat and clearcoat. Further details on this are found in Automotive Paints and Coatings, VCH Verlagsgesellschaft: Weinheim (1995).

The absence of a clearcoat is described for example in JP 2002080776 (one coat coating material composition). There, however, the reference is to metallic effect pigments which are already stable with respect to weathering on the basis of their inorganic nature. Moreover, enhanced scratch resistance and easy-to-clean properties, in combination with the optical properties described, are not achieved therein.

In further cases as well, the absence of an additional clearcoat is known. These monocoats, however, are coatings of relatively low quality, of the kind used, for example, in the industrial coatings sector. On the basis of their profiles of properties they are poorer, particularly in respect of weathering stability and of visual appearance. It should be emphasized here that the basecoat comprises the color pigments and the clearcoat is required to supply the necessary scratch resistance and UV stabilization.

Damage to the color-pigmented basecoat may affect both the binder and the pigment. From the literature it is known that color pigments possess states of electronic excitation (HOMO-LUMO, highest occupied molecular orbital, lowest unoccupied molecular orbital), which are then present in the form of a diradical. Starting from these species, there may be degradation reactions, especially if oxygen is also present.

In many cases, attempts are made to enhance scratch resistance in the clearcoat through incorporation of nanoscale particles. Nanoparticles of this kind are present to some extent at increased concentrations at the surface, and as a result of this the scratch resistance is not long-lasting, as soon as there is damage to the top clearcoat film. Systems of this kind are described in WO 01/009231, for example.

The approach of the self-healing clearcoats through a reduction in glass transition temperatures must also be considered critically, since the cured coatings used in such systems disclose a deficient dirt pickup behavior.

Furthermore, these clearcoat systems are solvent-borne. Only the solvent-borne polyurethane systems used possess a sufficient crosslinking density with a corresponding profile of properties. As a result of this, this multicoat system is also objectionable from an environmental standpoint. The water-based clearcoat systems encountered are of poorer quality.

In addition there may be problems of adhesion to the basecoat, since clearcoat and basecoat differ in terms of their solvents, their chemical structures, and their physical properties (expansion coefficients, glass transition temperatures).

In order to ensure stabilization of the pigments and binders in the basecoat against environmental effects and radiation, the subsequently applied clearcoat must possess corresponding stabilizers. Moreover, damage to the basecoat, in the event of inadequate protection by the clearcoat, is experienced as a result of penetrating water and oxygen as well.

The present-day multicoat system therefore has serious drawbacks with regard to the environment, economics, scratch resistance, pigmentation, and stability/durability.

Much described in the Japanese patent literature is the use of polysilazanes for increasing the scratch resistance. WO 2004/039904 A1 and WO 2006/113447 as well describe increasing the scratch resistance by means of polysilazanes. The applications in question, however, while indeed exhibiting a high scratch resistance, are nevertheless unsuitable for visually appealing incorporation of color pigments.

WO 2004/011212 likewise describes the use of polysilazanes. There, however, the invention is directed to the use of the polysilazanes as binders for clearcoats which can be used for rim coatings. Once again, these are not color-pigmented systems. WO 2005/085375 describes the incorporation of photocatalytically active $TiO_2$ but this is a two-coat system (first coat: PHPS, second coat: PHPS+$TiO_2$). Two-coat clearcoats of this kind have application disadvantages, and the described maximum coat thickness of 20 micrometers is not enough to produce color-pigmented systems with high hiding power. Higher coat thicknesses in the case of perhydropolysilazanes (PHPS) are susceptible to cracking.

The literature additionally describes polysilazane-containing paint systems that comprise dispersed pigments. JP 11269432, for example, describes the incorporation of pigments into polysilazanes using different dispersing devices. The systems described therein however, contain only perhydropolysilazane and are geared to producing thin (approximately 2 μm), transparent, light-transmissive coatings. Higher coat thicknesses are not possible with this material, since they become too brittle.

JP-A-2005 092 328 as well describes the combination of polysilazanes and color pigments. In this case, however, the polysilazane is used as a (co-binder) additive in order to improve the adhesion. The pigmentability of the system described therein is good, and their initial adhesion and long-term adhesion are good. On account of their high silicone content, however, the hardness here is only at a low level.

Trialkoxysilyl groups for moisture-induced paint curing are known and corresponding products are available industrially (e.g. Gelest). In this way it is possible to formulate paints, elastomers, and sealants based on silicone that cure at room temperature on exposure to moisture. Mention may also be made in this context of EP 1420947 B1. It describes a moisture-curing polysilazane and polysiloxazane for clearcoat applications and anticorrosion applications.

Coating the surfaces of pigments is also known and is widely practiced with the aim of enhancing compatibility with the application system and of ensuring that the pigment thus modified can be incorporated more effectively. It is also known that such pigments may be coated with silazane derivatives of low molecular mass. Examples are the Aerosils R812 and R8200 (Degussa), which are modified with hexamethyldisilazane (HMDS). As a result of the HMDS treatment the originally hydrophilic pigment surface becomes hydrophobic. This is an inorganic filler which changes the rheological properties of the liquid paint. The HMDS acts not as a binder but rather as a dispersant.

Theoretical considerations in the literature (R. Walsh, Bond dissociation energy values in silicon containing compounds and some of their implications, Accounts of Chemical Research, 1981, 14, 246-252) show that the dissociation energies of the Si—N bond (about 85-100 kcal/mol) are higher in comparison to the energies of C—N (70 kcal/mol) bonds.

The object is therefore to eliminate the above-described disadvantages of the coating systems described in the prior art and to provide a paint system which features not only a high and uniform hiding power but also a high hardness and therefore good scratch resistance, and which advantageously makes it possible to circumvent a multicoat paint system and circumvent the additional application of a clearcoat.

Surprisingly, it has now been found that, given an appropriate choice of a polysilazane binder and of the fillers, the object identified above can be achieved.

The color-pigmented paint system is distinguished by high scratch resistance, easy-to-clean properties and attractive hues. The high film thicknesses required are possible as a result of the use of organic polysilazanes, since these, in comparison to the perhydropolysilazanes, possess a higher elasticity in the cured paint. Accordingly, it is also possible to forgo the use of a co-binder, though without ruling out the use of such a co-binder. Therefore, pigmented paint coats with high hiding power are possible. Furthermore, the incorporated pigments, where pigment dispersion takes place in the presence of the binder, are easy to disperse, since the polysilazane itself possesses pigment stabilization properties and corresponding anchor groups. These functional groups in the polysilazane are not important merely for the color pigmentation; instead they take on an important role with regard to scratch resistance. The paint system can be applied not only to metal surfaces, especially aluminum, but also to coats of primer or surfacer materials. This can be decided according to the specific application.

The present invention accordingly provides a color-pigmented paint composition with high hiding power, comprising a solvent or a solvent mixture and a.) based on the total formulation, 1% to 80% by weight of a polysilazane of the formula (1)

  (1)

and b.) based on the total formulation 1% to 15% by weight, particularly 2% to 8% by weight, of one or more pigments where R', R", and R''' are alike or different and independently of one another are hydrogen or an unsubstituted or substituted alkyl, aryl, vinyl or (trialkoxysilyl)alkyl radical, n being an integer and n having a magnitude such that the polysilazane has a number average molecular weight of 150 to 150 000 g/mol.

The paint coats obtained with the paint composition of the invention possess a high color strength, outstanding hiding power, and improved scratch resistance and easy-to-clean properties. This can be attributed in particular to the fact that the polysilazane binder possesses crosslinking structures which as such also function as anchor groups for the color pigments, so making it possible to achieve uniform distribution of the binder and of the pigment in the solvent, a fact which leads to uniform pigmentation and, because of the homogeneous coats, to increased scratch resistance. The easy-to-clean properties can be demonstrated, for example, via measurements of contact angles. These properties are attainable only in the case of a suitable crosslinking density and polarity in the binder. In particular, the paint coats of the invention possess a contact angle of at least 85.

The paint compositions of the invention can be employed in particular where the requirement is for high weathering stability and improved cleaning properties on the part of the paint coatings.

Accelerated weathering tests in accordance with DIN 11341 (2000 h) on the paint coats produced with the paint compositions of the invention are not accompanied by chalking.

In one preferred embodiment, the polysilazanes used are polysilazanes in which R', R", and R''' independently of one another are a radical from the group of hydrogen, methyl, ethyl, propyl, isopropyl, butyl, isobutyl, tert-butyl, phenyl, tolyl, vinyl or 3-(triethoxysilyl)propyl, 3-(trimethoxysilylpropyl).

In another preferred embodiment the coating of the invention comprises polysilazanes of the formula (2)

  (2)

where R', R", R''', R*, R and R* independently of one another are hydrogen or an unsubstituted or substituted alkyl, aryl, vinyl or (trialkoxysilyl)alkyl radical, n and p having dimensions such that the polysilazane has a number-average molecular weight of 150 to 150 000 g/mol.

More particularly preferred are compounds in which
R', R''' and R*** are hydrogen and R", R* and R** are methyl;
R', R''' and R*** are hydrogen and R" and R* are methyl and R** is vinyl;
R', R''', R* and R* are hydrogen and R" and R are methyl.

Likewise preferred for use are polysilazanes of the formula (3)

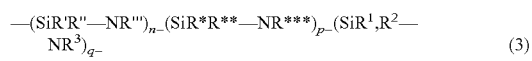  (3)

where R', R", R''', R*, R, R*, $R^1$, $R^2$ and $R^3$ independently of one another are hydrogen or an unsubstituted or substituted alkyl, aryl, vinyl or (trialkoxysilyl)alkyl radical, n, p and q having dimensions such that the polysilazane has a number-average molecular weight of 150 to 150 000 g/mol.

More particularly preferred are compounds in which R', R''' and R*** are hydrogen and R", R*, R** and $R^2$ are methyl, $R^3$ is (triethoxysilyl)propyl and $R^1$ is alkyl or hydrogen.

In general the amount of polysilazane (3) in the total formulation is 1% to 80%, preferably 5% to 70%, more preferably 20% to 60%, by weight.

The organic pigment may be a pigment from the group of the azo pigments, such as monoazo, disazo, naphthol, benzimidazolone, and metal complex pigments, or of the polycyclic pigments such as isoindolinone, isoindoline, anthanthrone, thioindigo, thiazineindigo, triarylcarbonium, quinophthalone, anthraquinone, dioxazine, phthalocyanine, quinacridone, quinacridonequinone, indanthrone, perylene, perinone, pyranthrone, diketopyrrolopyrrole, isoviolanthrone and azomethine pigments.

Preferred organic pigments for the purposes of the present invention are, for example, C.I. Pigment Yellow 1 (C.I. No. 11 680), C.I. Pigment Yellow 3 (C.I. No. 11 710), C.I. Pigment Yellow 12 (C.I. No. 21 090), C.I. Pigment Yellow 13 (C.I. No. 21 100), C.I. Pigment Yellow 14 (C.I. No. 21 095), C.I. Pigment Yellow 17 (C.I. No. 21 105), C.I. Pigment Red 123 (C.I. No. 71 145), C.I. Pigment Red 149 (C.I. No. 71 137), C.I. Pigment Red 178 (C.I. No. 71 155), C.I. Pigment Red 179 (C.I. No. 71 130), C.I. Pigment Red 190 (C.I. No. 71 140), C.I. Pigment Red 224 (C.I. No. 71 127), C.I. Pigment Violet 29 (CA. No. 71 129), C.I. Pigment Orange 43 (C.I. No. 71

105), C.I. Pigment Red 194 (C.I. No. 71 100), C.I. Pigment Violet 19 (CA. No. 73 900), C.I. Pigment Red 122 (CA. No. 73 915), C.I. Pigment Red 192, C.I. Pigment Red 202 (C.I. No. 73 907), C.I. Pigment Red 207, C.I. Pigment Red 209 (C.I. No. 73 905), C.I. Pigment Red 206 (CA. No. 73 900/73 920), C.I. Pigment Orange 48 (C.I. No. 73 900/73 920), C.I. Pigment Orange 49 (C.I. No. 73 900/73 920), C.I. Pigment Orange 42, C.I. Pigment Yellow 147, C.I. Pigment Red 168 (CA. No. 59 300), C.I. Pigment Yellow 120 (C.I. No. 11 783), C.I. Pigment Yellow 151 (C.I. No. 13 980), C.I. Pigment Brown 25 (C.I. No. 12 510), C.I. Pigment Violet 32 (C.I. No. 12 517), C.I. Pigment Orange 64; C.I. Pigment Brown 23 (C.I. No. 20 060), C.I. Pigment Red 166 (C.I. No. 20 730), C.I. Pigment Red 170 (CA. No. 12 475), C.I. Pigment Orange 38 (C.I. No. 12 367), C.I. Pigment Red 188 (C.I. No. 12 467), C.I. Pigment Red 187 (C.I. No. 12 486), C.I. Pigment Orange 34 (C.I. No. 21 115), C.I. Pigment Orange 13 (C.I. No. 21 110), C.I. Pigment Red 9 (CA. No. 12 460), C.I. Pigment Red 2 (C.I. No. 12 310), C.I. Pigment Red 112 (C.I. No. 12 370), C.I. Pigment Red 7 (C.I. No. 12 420), C.I. Pigment Red 210 (C.I. No. 12 477), C.I. Pigment Red 12 (C.I. No. 12 385), C.I. Pigment Blue 60 (0.1. No. 69 800), C.I. Pigment Green 7 (CA. No. 74 260), C.I. Pigment Green 36 (C.I. No. 74 265), C.I. Pigment Blue 15:1, 15:2, 15:3, 15:4, 15:6 and 15 (C.I. No. 74 160); C.I. Pigment Blue 56 (C.I. No. 42 800), C.I. Pigment Blue 61 (C.I. No. 42 765:1), C.I. Pigment Violet 23 (CA. No. 51 319), C.I. Pigment Violet 37 (C.I. No. 51 345), C.I. Pigment Red 177 (C.I. No. 65 300), C.I. Pigment Red 254 (C.I. No. 56 110), C.I. Pigment Red 255 (C.I. No. 58 1050), C.I. Pigment Red 264, C.I. Pigment Red 270, C.I. Pigment Red 272 (C.I. No. 56 1150), C.I. Pigment Red 71, C.I. Pigment Orange 73, C.I. Pigment Red 88 (C.I. No. 73 312), C.I. Pigment Yellow 175 (C.I. No. 11 784), C.I. Pigment Yellow 154 (C.I. No. 11 781), C.I. Pigment Yellow 83 (C.I. No. 21 108), C.I. Pigment Yellow 180 (C.I. No. 21 290), C.I. Pigment Yellow 181 (CA. No. 11 777), C.I. Pigment Yellow 74 (CA. No. 11 741), C.I. Pigment Yellow 213, C.I. Pigment Orange 36 (C.I. No. 11 780), C.I. Pigment Orange 62 (C.I. No. 11 775), C.I. Pigment Orange 72, C.I. Pigment Red 48:2/3/4 (C.I. No. 15 865:2/3/4), C.I. Pigment Red 53:1 (C.I. No. 15 585:1), C.I. Pigment Red 208 (CA. No. 12 514), C.I. Pigment Red 185 (C.I. No. 12 516), C.I. Pigment Red 247 (C.I. No. 15 915) and C.I. Pigment Red 146 (C.I. No. 12 485).

It is also possible for more than one organic pigment to be used. The use of inorganic chromatic pigments and other organic pigments is likewise possible.

Also possible is the use of pigment preparations. Examples that may be mentioned here include Sanodospers A and Hostatint preparations from Clariant Produkte (Deutschland) GmbH.

In one particularly preferred embodiment, the pigments used are Hostaperm Red D3G70, Hostaperm Green GNX, Hostaperm Blue BT627 D (all Clariant Produkte (Deutschland) GmbH).

Through the use of polysilazanes as a binder containing functional groups, the pigment is integrated in the binder in a way which bears part of the responsibility for the hardness and easy-to-clean properties of the resultant paint coats. This interaction between pigment and binder has beneficial consequences for the hardness of the paint coat, the reduced migration behavior of the pigments, and the elasticity of the paint coat, and scratch resistance.

The interaction may be chemical or physical in nature. The preferred functional groups in the binder molecule here are vinyl and/or trialkoxysilyl groups, more particularly triethoxysilyl groups.

Through the use of the polysilazanes as binders, the colored pigments finely divided in the solvent are protected in particular from damage caused by gases and caused by highly volatile compounds. Through the use of polysilazanes with a high gas barrier, as are described in WO 2006/056285 A1 for example, success is achieved in protecting the resultant paint coat with regard to hazardous degradation processes due to environmental gases. Mention may be made here in particular of steam and oxygen activated by UV radiation.

The solvent or solvent mixture used in accordance with the invention ought not to react with the binder, and for this reason alcohols and amines should be avoided. The solvent or solvent mixture ought not to be protic, and comes preferably from the group of esters, ethers, aromatics or aliphatics. A particularly advantageous example is butyl acetate. The corresponding solvent must be chosen here in accordance with curing method and curing time; the skilled worker is aware of the corresponding parameters.

The paint system may further comprise fillers and additives for exerting beneficial influence over the rheology, viscosity, flow, de-aeration, conductivity, etc. These parameters must be set in accordance with the method of application and relate to the liquid paint. Additives of this kind are available for example, from the companies Byk and Tego Chemie Service (both Germany). Moreover, products based on fumed silicas may be mentioned here. The following application methods are mentioned here: rolling, dipping, spraying (in turn in various methods), and printing. The specific paint requirements for the respective process are known to the skilled worker and must be set via the corresponding additives.

The paint system may further comprise compounds and additives for exerting beneficial influence over the hardness, surface smoothness and slip behavior. These parameters must be set in accordance with requirements and relate to the cured paint. Additives of this kind are like-wise available from the companies Byk and Tego Chemie Service.

The paint formulation of the invention may be applied by one of the aforementioned processes, and the film thicknesses achieved after curing are between 5 and 300 μm, particular suitability being possessed by coat thicknesses between 10 and 100 μm, especially between 25 and 60 μm. If the high wet film thicknesses cannot be applied in one operation, a further application is made after a short evaporation time.

The paint system is then dried at room temperature and/or in an oven at atmospheric humidity of 30% to 80%, especially 40% to 70%, and oven temperatures <100° C. This may be followed by a drying operation at higher temperatures and lower atmospheric humidities.

EXAMPLES

Example 1

Preparation of a Red-Pigmented Polysilazane Paint Formulation

| Component | Mass/g |
|---|---|
| Premix | 50.0 |
| Tego Additive | 0.16 |
| n-Butyl acetate | 12.39 |
| Hostaperm, Red D3G | 2.45 |
| ML33/C12 | 35.0 |

The premix is prepared from 90.9 g of n-butyl acetate and 9.1 g of CAB. The premix is admixed with Tego Glide and the red pigment is added. Subsequently, the millbase has glass beads added to it, and the viscosity is adjusted using n-butyl acetate. After 30 minutes, the polysilazane ML33/C12 is added and stirring is continued for 5 to 10 minutes. Thereafter the beads are removed by filtration.

Substances used:
CAB Cellulose acetate butyrate, Eastman Chemicals
Tego Additive Tego additive, Tego Chemie Service GmbH, Essen, Germany
n-Butyl acetate Solvent, Eastman Chemical
Hostaperm Red D3G70 Pigment, Clariant AG, Muttenz, Switzerland
Clariant KiON ML33/C12 Polysilazane, Clariant AG, Muttenz, Switzerland In the same way, pigmented paint formulations are produced by preparing formulas 2-4. Different concentrations of pigment were used.

Example 2

Hostaperm Blue 627 D, Clariant

Pigment concentration: 1.75%

Example 3

Hostaperm Green GNX, Clariant

Pigment concentration: 2.45%

Example 4

Shepered black EX 1245, Shepherd Color Company, Cincinnati, USA

Pigment concentration: 8.2%

Examples 5 to 7 serve as reference examples. The pigments used were identical. Organic binders were used as the binders here.

Reference Example 5

Air-Drying Long-Oil Alkyd Paint

Pigment dispersion takes place with a grinding varnish based on Vialkyd AS 673 (UCB resins). The millbase is let down likewise using a system based on Vialkyd AS 673. Curing takes place first at room temperature for 15 minutes and thereafter at 60° C.

Reference Example 6

Alkyd-Melamine Baking Varnish

Pigment dispersion takes place with a 35% grinding varnish based on Vialkyd AS 451 (UCB resins). The millbase is let down using a letdown mixture with Vialkyd and Maprenal (UCB Resins). Curing takes place after evaporation at 140° C. for 20 minutes.

In example 7, additionally, a clearcoat material was applied which possessed corresponding UV stabilizers:

Reference Example 7

Alkyd-Melamine Baking Varnish Plus Clearcoat

The same as 6, but with additional clearcoat
The formulas from examples 1 to 7 were then applied, cured and tested.
Further information on this is given in table 1.

TABLE 1

| No. | Binder | Pigment | Weathering test in analogy to DIN ISO 11341, 3000 h |
|---|---|---|---|
| 1 | ML33/C12 | Hostaperm Red D3G | No chalking |
| 2 | ML33/C12 | Hostaperm Blue BT327 D | No chalking |
| 3 | ML33/C12 | Hostaperm Green GNX | No chalking |
| 4 | ML33/C12 | Shepered black EX 1245 | No chalking |
| R5 | Long-oil alkyd | Hostaperm Red D3G | Chalking |
| R6 | Alkyd melamine | Hostaperm Blue BT327 D | Chalking |
| R7 | Alkyd melamine (+clearcoat) | Hostaperm Blue BT327 D | No chalking |

TABLE 2

Coloristic evaluation of the samples after 3000 h weathering test (instrument: Atlas CI 5000, method: DIN EN ISO 11341):

| Example | Coat thickness/μm | Pencil hardness after 3000 h accelerated weathering |
|---|---|---|
| 1 | 25 | 4 H |
| 2 | 28 | 6 H |
| 3 | 26 | 4 H |
| 4 | 49 | 4 H |
| R5 | 30 | 2 B |
| R6 | 28 | F |
| R7 | 27 + 30 | F |

Example 8A to E

A 27% long-oil alkyd/$TiO_2$ white paint (binder Vialkyd AS 673, UCB Resins; $TiO_2$ Kronos 2059) is admixed in different proportions with polysilazane ML33/C12 (KiON, Clariant AG). The mixture was applied to glass and coated test paper, using a 100 mm film-drawing frame, and the applied films following evaporation were cured at room temperature for 1 hour.

| Example | White paint | ML33/C12 |
|---|---|---|
| 8 A: | 10.0 g | 0 g |
| B | 9.0 g | 1.0 g |
| C | 7.0 g | 3.0 g |
| D | 5.0 g | 5.0 g |
| E | 0.0 g | 10.0 g |

| Example | Pendulum hardness after 1 d and 14 d Oscillations | | Contact angle (against water) |
|---|---|---|---|
| A | 17 (1 d) | 32 (14 d) | 92 |
| B | 20 (1 d) | 27 (14 d) | 97 |

| Example | Pendulum hardness after 1 d and 14 d Oscillations | Contact angle (against water) |
|---|---|---|
| C | 28 (1 d) 36 (14 d) | 98 |
| D | 51 (1 d) 56 (14 d) | 99 |

Instruments:

Pendulum hardness measuring instrument manufacturer: Byk Gardner Contact angle measuring instrument, manufacturer: prop Shape Analysis System, DSA 10 Mk2

Example 9

Easy-to-Clean Application

A cured red paint coat on an aluminum Q-panel according to example 1 is sprayed with a solvent-borne paint (Rust Oleum Painter's Touch, Rust Oleum, Vernon Hills, USA) and cured at room temperature overnight. The next morning the graffiti paint is removed with a high-pressure water jet device. The graffiti paint can be removed without residue. There is no damage to the pigmented polysilazane paint coat. The same location on the polysilazane paint coat can be sprayed with graffiti paint five times and removed five times without residue. A polyurethane-based paint coat sprayed as a reference undergoes failure during the first cleaning cycle, where the graffiti paint cannot be removed using a high-pressure water jet device.

The invention claimed is:

1. A color pigmented paint comprising a solvent or a solvent mixture and
   a) based on the total formulation, 1% to 80% by weight of a polysilazane of the formula (1) which contains at least one pigment binding functional group —(SiR'R"—NR''')$_n$— (1)

wherein R', R", and R''' are the same or different and independently of one another are hydrogen or an unsubstituted or substituted alkyl, aryl, vinyl or (trialkoxysilyl)alkyl, provided that the polymer contains at least one pigment binding functional group selected from vinyl or (trialkyloxysily) alkyl -functional groups; n being an integer and n having a magnitude such that the polysilazane has a number average molecular weight of 150 to 150 000 g/mol composition and
   b) 1% to 15% by weight in the total formulation of one or more organic pigments which is present as dispersion, furthermore, wherein the paint composition is curable at temperatures lower than 100° C.

2. The paint composition of claim 1, wherein R', R", and R''' independently of one another are a radical selected from the group consisting of hydrogen, methyl, ethyl, propyl, isopropyl, butyl, isobutyl, tert-butyl, phenyl, tolyl, vinyl, 3-(triethoxysilyl)propyl, and 3-(trimethoxysilylpropyl).

3. The paint composition of claim 1, wherein a polysilazane of the formula (2) is used —(SiR'R"—NR''')$_n$—(SiR*R—NR*)$_p$-(2) wherein R', R", R''', R*, R and R* independently of one another are hydrogen or an unsubstituted or substituted alkyl, aryl, vinyl or (trialkoxysilyl) alkyl functional groups, provided that the polymer contains at least one pigment binding functional group derived from vinyl or (trialkyloxysily) alkyl functional groups; n and p having dimensions such that the polysilazane has a number-average molecular weight of 150 to 150 000 g/mol.

4. The paint composition of claim 1, wherein the polysilazane of formula (3) is used —(SiR'R"—NR''')$_n$—(SiR*R—NR*)$_p$—(SiR$^1$,R$^2$—NR$^3$)$_p$— (3)

wherein R', R", fr, R*, R, R*, R$^1$, R$^2$ and R$^3$ independently of one another are hydrogen or an unsubstituted or substituted alkyl, aryl, vinyl or (trialkoxysilypalkyl functional groups, provided that the polymer contains at least one pigment binding functional group derived from vinyl or (trialkyloxysily) alkyl functional groups; n, p and q having dimensions such that the polysilazane has a number-average molecular weight of 150 to 150 000 g/mol.

5. The paint composition of claim 4, wherein R', R''' and R*** are hydrogen and R", R*, R** and R$^2$ are methyl, R$^3$ is (triethoxysilyl)propyl and R$^1$ is alkyl or hydrogen.

6. The paint composition of claim 1, wherein an organic pigment is selected from the group consisting of: azo pigments, metal complex pigments and polycyclic pigments.

7. The paint composition of claim 1, wherein the solvent is selected from the group consisting of esters, ethers, aromatics and aliphatics.

8. The paint composition of claim 1, further comprising at least one additive.

9. The paint composition of claim 8, further comprising a co-binder selected from the group consisting of physically drying and reactive binders.

10. The paint composition of claim 1, wherein the paint composition has thickness when applied to a surface of from 5 and 300 μm.

11. A coat of paint obtained by coating with a paint composition of claim 1, wherein accelerated weathering of the paint coat in accordance with DIN 11341 (2000 h) is not accompanied by chalking.

12. A coat of paint obtained by coating with a coating composition of claim 1, wherein the coat of paint has a contact angle of at least 85.

13. The paint composition of claim 1, wherein the organic pigment is selected from the group consisting of monoazo, disazo, naphthol and benzimidazolone pigments.

14. The paint composition of claim 1, wherein the organic pigment is selected from the group consisting of isoindolinone, isoindoline, anthanthrone, thioindigo, thiazineindigo, triarylcarbonium, quinophthalone, anthraquinone, dioxazine, phthalocyanine, quinacridone, quinacridonequinone, indanthrone, perylene, perinone, pyranthrone, diketopyrrolopyrrole, isoviolanthrone and azomethine pigments.

15. The paint composition of claim 1, wherein the paint composition has high color strength and durability, and good scratch resistance.

16. The paint composition of claim 1, wherein the paint composition is curable at room temperature.

17. The paint composition of claim 1, wherein the polymer contains at least one pigment binding functional group selected from (trialkyloxysily) alkyl functional group.

18. The paint composition of claim 1, wherein the polymer contains at least one pigment binding functional group selected from vinyl functional group.

* * * * *